Figure 1:
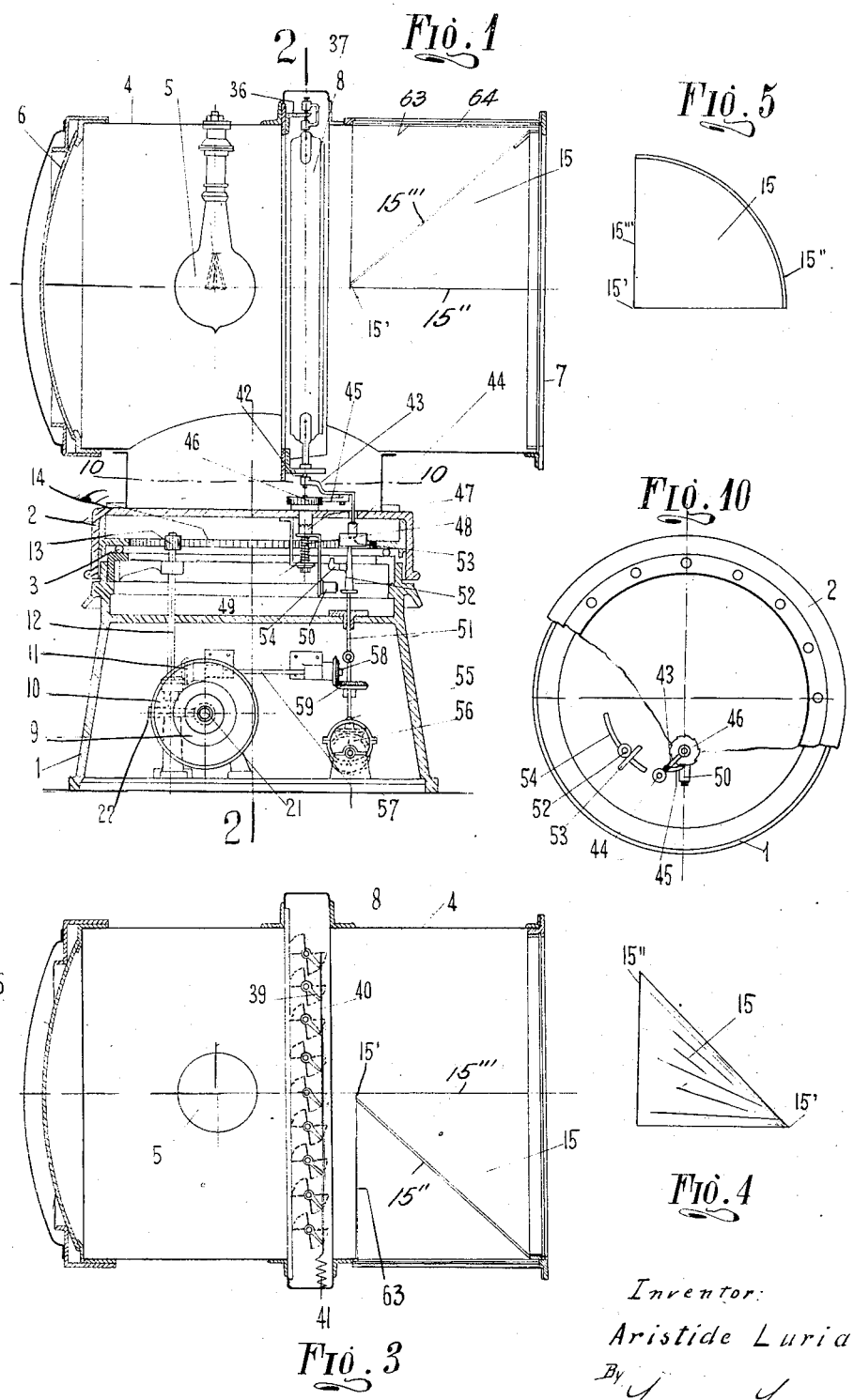

Jan. 8, 1924.

A. LURIA

LIGHT SIGNALING APPARATUS

Filed Nov. 8, 1921    2 Sheets-Sheet 1

Inventor:
Aristide Luria
By Lawrence Langner
Attorney

Jan. 8, 1924.
A. LURIA
1,479,861
LIGHT SIGNALING APPARATUS
Filed Nov. 8, 1921      2 Sheets-Sheet 2
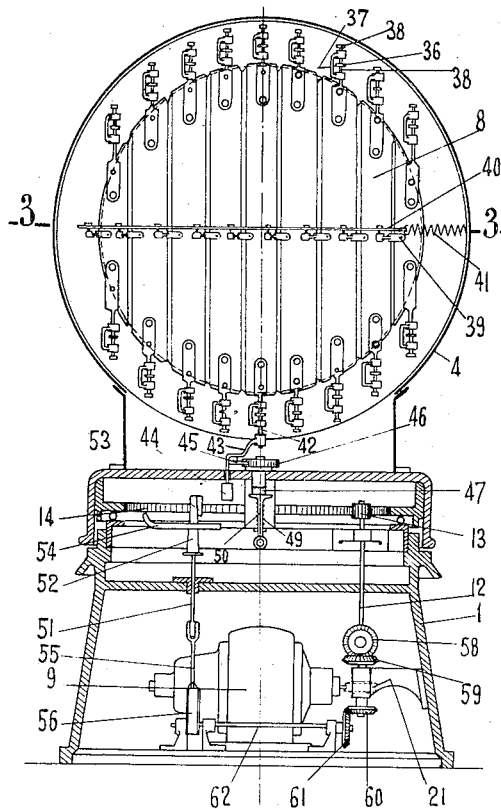
Fig. 2
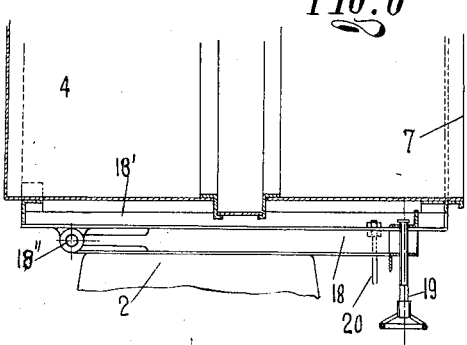
Fig. 6
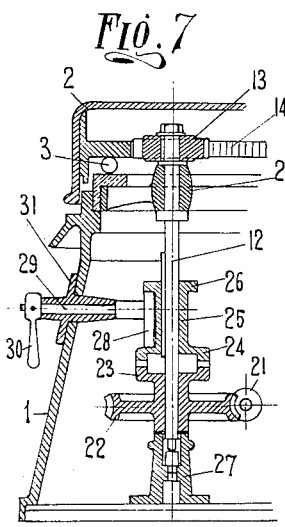
Fig. 7
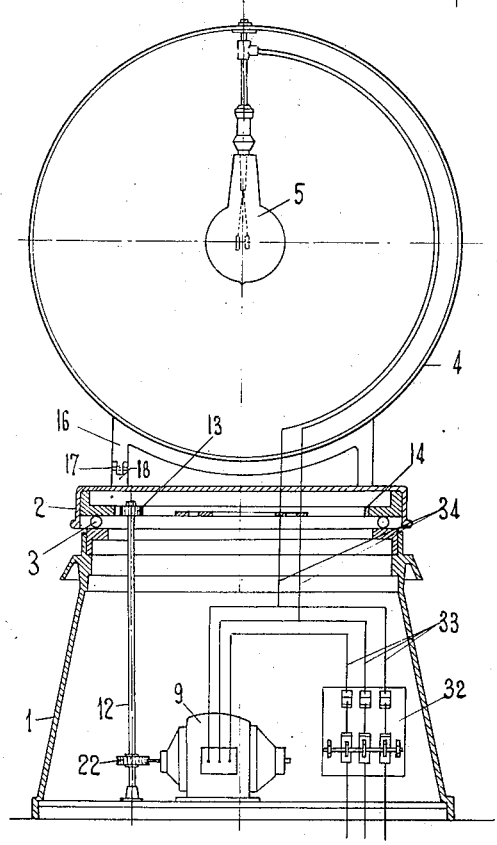
Fig. 8
Fig. 9
Inventor:
Aristide Luria
By Lawrence Langner
Attorney Patented Jan. 8, 1924.

1,479,861

UNITED STATES PATENT OFFICE.

ARISTIDE LURIA, OF TURIN, ITALY.

LIGHT-SIGNALING APPARATUS.

Application filed November 8, 1921. Serial No. 513,711.

*To all whom it may concern:*

Be it known that I, ARISTIDE LURIA, a subject of the King of Italy, and resident of Turin, Italy, have invented certain new and useful Improvements in Light-Signaling Apparatus, of which the following is a specification.

The present invention relates to means for giving light signals and particularly flash light signals.

This invention applies particularly to light signals for aircrafts and comprises means for obtaining a light beam extending from the horizon up to the zenith and means for rotating said beam.

Another feature of this invention consists in means for imparting at will any desired characteristic to the signals, that is for obtaining revolutions with the light darkened or shut off, which alternate with lighting revolutions under any desired timing and rule, an observer thus perceiving a succession of flashes following each other at even and different periods of time which may be adjusted at will.

This invention provides also means for the operation and the control of the projector and other features which are hereinafter described and claimed.

In the annexed drawings: Figure 1 is the central vertical section of the projector; Figure 2 is the transverse section of the projector on the line 2—2 of Figure 1; Figure 3 is the plan section on line 3—3, Figure 2; Figure 4 is the side view of a reflector used in the projector; Figure 5 is the front view of the same; Figure 6 shows the mounting of the projector body; Figure 7 is a fragmentary sectional view showing the gear for controlling the revolution of the projector; Figure 8 is a fragmentary front view of said gear; Figure 9 is a diagrammatic view showing the wirings; Figure 10 is a fragmentary sectional view on line 10—10 of Figure 1 showing in detail the device for the control of the shutter.

As shown by said figures the projector comprises a support 1 on which is rotatably mounted a turntable 2, antifriction members 3 being located between said parts. On said turntable is mounted the projector comprising a body 4 in which are located a source of light 5, a parabolic mirror 6 and a shutter hereinafter described and comprising blades 8, the mouth of said body being closed by a glass 7. Within the post 1 are located the means for putting the projector body in revolution around its vertical axis, these means comprising an electromotor 9 driving a toothed rim 14 solid with the turntable 2 by the intermediate of the worm gears 21—22, shaft 12 and pinion 13. Said electromotor also operates a device controlling the shutter blades 8, as hereinafter described.

According to one of the features of this invention in the front portion of the projector body, that is opposite to the lamp 5 with regard to the shutter 8, is located a mirror 15 having the shape shown by Figures 4 and 5. This mirror consists of one fourth of a cone having an apex angle of 90°, and is located with its apex 15' on the projection axis (see Figures 1–3) and with its edge 15'' (having the shape of a fourth of a circle) at the mouth of the projector and concentric with the projection axis, its side edges 15'''—15''' lying respectively in vertical and horizontal planes passing through the projection axis.

Thus one portion of the light beam produced by the lamp 3 and mirror 6 (that is one fourth of its cross section) is deviated by the mirror 15 and thus is obtained a conical light beam or fan which extends from a line parallel to the projection axis up to a line perpendicular to the first named one.

An opening 63 closed by a glass 64 is provided in the projector body 4 for the issue of the light beam or fan.

Figure 6 shows an arrangement for rocking the projector body in the vertical direction for its use as search light and the like. This arrangement comprises a frame 16 which is solid to the projector body and is pivoted at 17 to a support 18 which is carried by the turntable 2; a hand-operated screwthreaded spindle 19 is screwed in the support 18 and has its end rotatably engaged with the frame to provide means for rocking the projector body around its pivots 17. Tails 20 depending from the frame 16 and engaging slots of the support 18 assist in holding the projector body in its true position.

Figures 7 and 8 show a clutch arrangement embodied in the gear transmitting the drive of the electromotor 9 to the turntable 2.

In this construction the worm 21 solid with the electromotor shaft drives a worm wheel 22 solid with a toothed cup 23 and loose on the shaft 12 which is journalled in suitable bearings 27—27. This shaft 12 carries the pinion 13 driving the toothed rim 14 of the turntable 2, and a sleeve 25 is mounted to slide endwise on it, this sleeve being solid in rotation with said shaft and having a toothed cup 24 adapted to mesh with the similar toothed cup 23 of the worm wheel 22. Said sleeve 25 is further provided with a rim 26 engaged by an eccentric 28 which is carried by a spindle 29 pivoted in a sleeve 31 fastened to the support 1, and is controlled by a handle 30. It is clear that by rocking the eccentric or cam 28 counterclockwise in Figure 8 the part 24 is removed from the cooperating part 23 and the drive is no longer imparted to the shaft 12 and turntable 2.

Figure 9 shows diagrammatically the electric wiring in the case of a threephase current feed; the line mains lead to a switch 32 adapted to connect them with the motor supply conductors 33, as well as with the conductors 34 leading to the lamp 5.

As it is shown an electric incandescent lamp 5 is used, but of course any other well known source of light as an arc lamp or the like may be used.

When the current is supplied to the motor 9 and to the lamp 5, the projector is rotated and the apparatus produces a substantially horizontal beam and a vertical fan extending from said horizontal beam up to the zenith, these beam and fan being rotated in a continuous manner.

Therefore an observer located at a certain distance from the apparatus perceives a flash of light at each revolution of the projector, that is, each time the projection axis is directed towards it; this flash is perceived regardless to the position or height of the observer with respect to the projector owing to said conical fan and therefore this apparatus provides means for signaling both to observers located on the ground and on the sea, and to aircraft travellers.

Another feature of this invention consists in a device by means of which a given characteristic may be imparted to the signals.

This characteristic of the signals consists in the rule and timing under which the light source of the projector is shut off by means of the shutter along one complete revolution of the projector body. Of course the projector may be caused to accomplish one or more revolutions with the light shut off each one or more revolutions with the shutter open, and thus may be obtained groups of flashes combined with periods of darkness.

For this purpose the projector is provided with a shutter consisting of a number of parallel blades 8 which are pivoted in extensions 36 carried by the projector body 4; said blades are pivoted by means of points 38 engaging recesses of the extensions 36, the outer one of said points being carried by a yoke 37 solid with the associate blade; said pivot points 38 are screw-threaded in the supporting parts for adjusting purposes. Each of the blades 8 is provided with an arm 39 and these arms are pivotally connected to the longitudinal rod 40, a spring 41 holding said rod, arms and blades in their open position shown by Figure 1.

The device for controlling the shutter during the projector revolution comprises a stem 42 depending from one of the blades 8 and having an arm 43 provided with an antifriction roller 44 and a pawl 45. This pawl 45 is adapted to engage a ratchet disk 46 which is loose on the spindle 48 fastened to the turntable 2 and is locked by a clutch sleeve 47 which is mounted to move endwise but prevented from rotating on said spindle; this sleeve 47 is held by a spring 49 into engagement with the hub of the wheel 46 which is thereby locked against rotation. An arm 50 depends from said sleeve 47 for the purpose hereinafter described.

In the stationary post 1 is mounted to reciprocate a vertical stem 51 which is actuated by a rod 55 and an eccentric 56, this latter being driven by the electromotor 9 through the intermediate of the gear 21—22—10—11, shaft 57, pinions 58—59—60—61 and shaft 62. Said stem 51 is provided with an enlarged portion 52 having a top stud 53 and a cam member 54 below said stud.

Assuming the electric motor 9 is actuated, the turntable 2 and the projector body 4 are put in revolution counterclockwise in Figure 10 through the gear 21—22—12—13—14 and the stem 51 is reciprocated through its actuating device just above described, the ratio and timing of the several gears being such that when the top stud 53 is at its uppermost position the roller 44 of the arm 43 is just in position to engage said stud 53, the blades being at this time held opened, as in Figure 1, by the spring 41. Then, as soon as the roller 44 and arm 43 engage the stud 53, said arm 43 is rotated clockwise around its own axis (see Figure 3) and it oscillates the stem 42, and thus the blades 8 are carried in shutting position against the action of the spring 41, and they are held in this position by the pawl 45 engaging the ratchet wheel 46. Thus begins a revolution of the projector with the shutter blades closed; at the end of the first revolution the roller 44 is not acted on by the projection or stud 53 which is moving down owing to the reciprocation of the stem 51 but at the same time the cam member 54 carried by the same stem 51 is not yet in position to engage the arm 50 and therefore the projector turns through another revolution with the blades in closed position as the pawl 45 engaging the ratchet wheel 46 locks the blades against the action of their spring 41.

At the beginning of the third revolution the cam member 54 has been carried in a position to engage the arm 50 and to move it down with the clutch sleeve 47 against the action of the spring 49, this releasing the ratchet wheel 46 and enabling it to rotate back with the pawl 45, the blades 8 being thus opened by their spring 41.

Thereafter the projector continues its rotation with the shutter open until the reciprocation of the stem 51 has carried the stud 53 in position to cooperate with the roller 44 and arm 43 and to repeat the above described operation, this taking place after two revolutions in view of the ratio of gears used.

Thus are obtained two revolutions with the shutter closed and then two revolutions with the shutter open, and during the continuous operation of the projector an observer perceives a series of groups each of two flashes with a short intermediate period of darkness and followed by a long period of darkness.

Of course by changing the respective position of the stud 53 and of the cam member 54 and by modifying the gearing ratio of the drive, any desired operation of the projector may be obtained.

It is to be understood that many changes may be made in the construction and arrangement of the apparatus and in several gears and devices for its operation without departing from the spirit of this invention which is only defined by the appended claims.

What I claim as my invention and desire to secure by United States Letters Patent is:—

1. A light signaling apparatus comprising a source of light, a parabolic mirror for producing a substantially horizontal luminous beam, a reflector having substantially the shape of one fourth of a cone, said reflector having its apex on the projection axis and its straight edges lying on vertical and horizontal planes, respectively, passing through said projection axis, and operating to deflect a portion of said beam to produce a luminous fan-shaped beam lying in a plane transverse to said beam and extending from horizon to zenith, and means for rotating said apparatus around a substantially vertical axis.

2. A light signaling apparatus comprising a stationary support, a turn table on said support, an electromotor and a gear for driving said turn table, this gear including a clutch and controlling means for the same, a casing on said turn table, a source of light and a parabolic mirror in said casing for producing a luminous beam, a reflector having substantially the shape of one fourth of a cone and located in said casing with its apex on the projection axis of the light source and its straight edges lying in vertical and horizontal planes, respectively, passing through said projection axis, a blade shutter in the casing, and cooperating means on said shutter, turn table and stationary support, to close and open said shutter according to a given rule during the even revolution of said turn table and casing.

3. A light signaling apparatus comprising a stationary support, a turn table on said support, means for driving said turn table, a casing pivoted on said turn table, a projector body in this casing, parts on said turn table and casing to swing this latter around its journals, a source of light and a parabolic mirror for producing a light beam, a reflector having substantially the shape of one fourth of a cone and located in said projector body with its apex on the projection axis and its straight edges lying in vertical and horizontal planes, respectively, passing through said projection axis, a blade shutter, and cooperating means on said shutter, turn table, rotatable member and stationary support, for closing and opening said shutter according to a given rule during even revolutions of said turn table and projector body.

4. A light signaling apparatus comprising a stationary support, a turn table on said support, means for driving said turn table, a projector on said turn table, this projector comprising means for producing a substantially horizontal luminous beam and a luminous fan at an angle with respect to said horizontal beam, a blade shutter in the projector and biasing means, for biasing the blades of the shutter to a given position, mechanism for actuating said blades, to shift said blades against the action of said biasing means, a controller for the actuating mechanism, a stop for keeping said blades in said shifted position, and a member for automatically releasing said stop after a given number of revolutions of said turn table.

5. A light signaling apparatus comprising a stationary support, a turn table mounted on said support, a driving means for said turn table, a projector on said turn table, said projector comprising a light source for producing a substantially horizontal luminous beam and a luminous fan at an angle with said luminous beam, a blade shutter, a spring for biasing the blades of said shutter to a given position, means for actuating said blades, a reciprocating stem in said support, means under the control of the said stem for shifting the blade actuating means and blades against the action of said spring, a rotary toothed disc, a stop for said disc, a dog engaging said disc for holding said actuating means and blades in shifted position, and releasing means for said disc to free it whereby to leave the blades free after a given number of revolutions of said turn table.

6. A light signaling apparatus comprising a stationary support, a turn table on said support, means for rotating said turn table, a projector body on said turntable, this projector body enclosing a source of light and a parabolic mirror for producing a light beam, a reflector having the shape of substantially one fourth of a cone and located in said projector body, with its apex on the projection axis and its straight edges lying in vertical and horizontal planes, respectively, passing through said projection axis, a blade shutter, a spring for holding the blades of this shutter in a given position, a member for actuating said blades, a rod reciprocating in said stationary support, means for actuating said reciprocating rod to shift said actuating part and blades against the action of the spring, a stop for holding said actuating part and blades in shifted position, and a member for releasing said actuating part and blades after a given number of revolutions of said projector body.

7. A light signaling apparatus comprising a stationary support, a turn table on said support, means for rotating said turn table, a projector on said turn table, this projector enclosing a source of light and a parabolic mirror for producing a luminous beam, a reflector having the shape of substantially one fourth of a cone and located in said projector body with its apex on the projection axis and its straight edges lying in vertical and horizontal planes passing respectively through said projection axis, a blade shutter and a spring for normally holding the blades of the shutter in a given position, an actuating part for said blades, a rod reciprocating in said stationary support, means for operating the reciprocating rod to shift said actuating part and blades against the action of said spring, a rotatable toothed disc, a stop for said disc, a second disc engaging the first said disc for holding said actuating part and blades in shifted position, and a member for automatically releasing the first said disc and blades, after a given number of revolutions of said turn table and projector.

Signed at Turin, Italy this 6th day of Oct., 1921.

ARISTIDE LURIA.